United States Patent
Noe et al.

(10) Patent No.: US 9,222,614 B2
(45) Date of Patent: Dec. 29, 2015

(54) TILT-ROLL TABLE FOR USE IN CLEANING UF$_6$ CYLINDERS

(71) Applicant: Transport Logistics, Int'l, Inc., Fulton, MD (US)

(72) Inventors: Ronald O. Noe, Hopkins, SC (US); Andrew K. Langston, Wilmington, NC (US)

(73) Assignee: Transport Logistics International, Inc., Fulton, MD (US)

( * ) Notice: Subject to any disclaimer, the term of this patent is extended or adjusted under 35 U.S.C. 154(b) by 49 days.

(21) Appl. No.: 14/272,153

(22) Filed: May 7, 2014

(65) Prior Publication Data

US 2014/0334903 A1 Nov. 13, 2014

Related U.S. Application Data

(60) Provisional application No. 61/821,845, filed on May 10, 2013.

(51) Int. Cl.
*A23B 4/32* (2006.01)
*B01F 11/00* (2006.01)
(Continued)

(52) U.S. Cl.
CPC ........ *F16M 11/2028* (2013.01); *B01F 11/0025* (2013.01); *B01F 11/0062* (2013.01); *B01F 15/0074* (2013.01); *B08B 9/0817* (2013.01); *B23K 37/0538* (2013.01)

(58) Field of Classification Search
CPC ............ F16M 11/2028; B01F 11/0025; B01F 11/0062; B01F 15/0074; B08B 9/0817
USPC ................... 206/318, 319; 219/60 A; 228/48; 241/176, 177, 178; 242/393, 399, 242/399.1; 269/17, 287, 296, 51; 29/281.4; 366/219, 220, 223; 410/47, 48; 414/431, 433, 757, 758, 777, 782
See application file for complete search history.

(56) References Cited

U.S. PATENT DOCUMENTS 2,041,984 A * 5/1936 Vetorino ......................... 269/17
2,329,613 A * 9/1943 Hokanson et al. .............. 269/74
(Continued)

FOREIGN PATENT DOCUMENTS

CA      1153365 A1   9/1983
DE      2725080      12/1978
(Continued)

OTHER PUBLICATIONS

European Search Report, EP14167770, dated Sep. 3, 2014.
(Continued)

*Primary Examiner* — Gregory Adams
(74) *Attorney, Agent, or Firm* — Winston & Strawn LLP (57) ABSTRACT

A tilt roll table for use with uranium hexafluoride cylindrical containers securely holds the container, supported from its domed ends by spindles mounted to brackets as the container is tilted and rolled. The spindles have greater surface area over which to distribute the weight and are shaped to complement the domed container ends. The brackets supporting the spindles, stiffened by vertical and horizontal braces, can be adjusted vertically and moved axially toward and away from the domed ends of the containers by a gear drive to accommodate different sizes of cylindrical containers. In addition, bands encircle the containers to hold them onto the frame during tilting and rolling.

21 Claims, 7 Drawing Sheets

(51) Int. Cl.
*B01F 9/00* (2006.01)
*G21F 9/00* (2006.01)
*F16M 11/20* (2006.01)
*B23K 37/053* (2006.01)
*B01F 15/00* (2006.01)
*B08B 9/08* (2006.01)

(56) References Cited

U.S. PATENT DOCUMENTS

| | | | | |
|---|---|---|---|---|
| 2,366,961 A | * | 1/1945 | Fine et al. | 405/153 |
| 2,758,367 A | * | 8/1956 | Dougherty | 228/173.6 |
| 2,825,477 A | * | 3/1958 | Ross | 29/559 |
| 4,054,292 A | * | 10/1977 | Stone | 277/369 |
| 4,184,801 A | * | 1/1980 | Nicoloff et al. | 414/608 |
| 4,214,518 A | * | 7/1980 | Petsche | 99/535 |
| 4,447,012 A | * | 5/1984 | Woodruff | 242/423.1 |
| 4,836,099 A | * | 6/1989 | Thirode | 99/472 |
| 6,322,061 B1 | * | 11/2001 | Maser et al. | 269/17 |
| 7,913,390 B2 | * | 3/2011 | Masters et al. | 29/897.2 |
| 2011/0109030 A1 | | 5/2011 | Flaig | |

FOREIGN PATENT DOCUMENTS

| | | | | |
|---|---|---|---|---|
| DE | EP 2377603 A1 | * | 10/2011 | B01F 9/0001 |
| FR | 2448769 A1 | | 9/1980 | |
| JP | 2010022720 | | 2/2010 | |

OTHER PUBLICATIONS

Pages from Koike Aronson products catalog identified as Form 07/11KENG.

* cited by examiner

TILT-ROLL TABLE FOR USE IN CLEANING UF$_6$ CYLINDERS

PRIORITY CLAIM

The priority claim is made to U.S. Provisional Patent Application dated May 1, 2013, Ser. No. 61/821,845, which is incorporated herein in its entirety by reference.

BACKGROUND OF THE INVENTION

Figure 1:
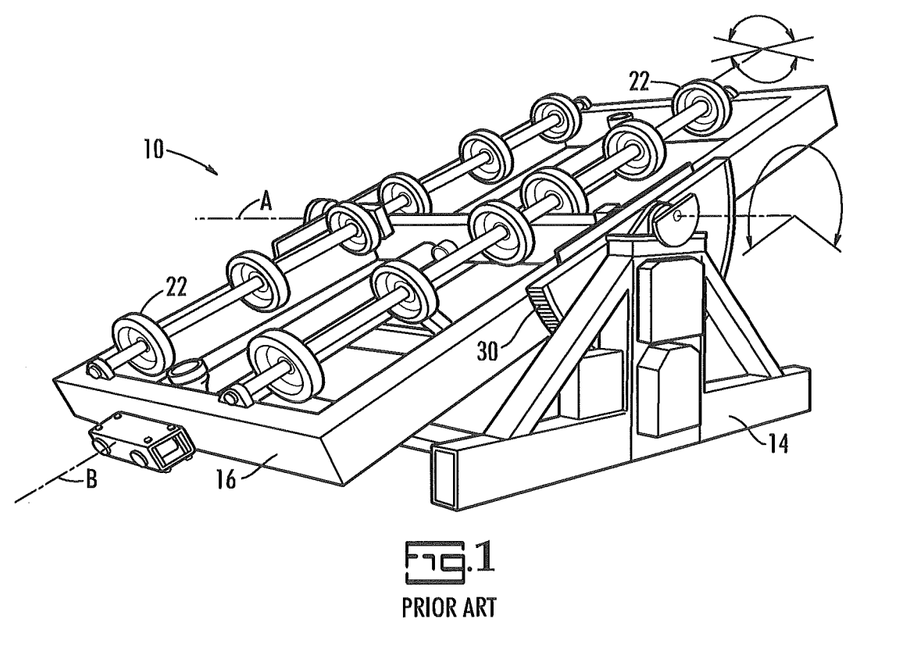
FIG. 1 illustrates in perspective a prior art tilt roll table

A tilt-roll table is a device that permits mixing of chemicals in containers. An example of a prior art tilt-roll table is that sold by Koike-Aronson. As shown in FIG. 1, the prior art tilt-roll table generally indicated by reference number 10, includes a base 14 that carries a frame 18 with rollers 22. Frame 18 tilts through a limited angle about a horizontal axis A, and rollers 22 roll about axes parallel to the indicated axis B which is perpendicular to the horizontal tilting axis A. A first motor carried by base 14 drives a pinion gear (not shown in FIG. 1) against a toothed, curved rack 30 mounted to frame 18 tilts frame 18. Rotation of a cylindrical container on frame 18 is effected by a second motor, carried by frame 18 that rotates one or more rollers 22 carried by frame 18. The first and second motors are not shown in FIG. 1. The combined motion of tilting and rolling produced by a tilt-roll table 10 will cause a cylindrical container on frame 18 to tilt and to roll and thus mix liquid contents over the interior surfaces of the container.

SUMMARY OF THE INVENTION

The present invention is an improvement in tilt roll tables expressly for use with uranium hexafluoride cylindrical containers. Uranium hexafluoride (UF$_6$) is shipped in cylindrical containers that meet industry standards. From time to time, the used containers are washed on the inside as part of the process of container recertification which is required for continued use of the containers. Because of container size and weight, a tilt-roll table may be used to assist in the washing process.

The improved tilt roll table securely holds the UF$_6$ container, which may weigh several hundred pounds. In particular, the present tilt roll table supports the domed ends of the container rather than the skirts of the container and does so with spindles that have greater surface area over which the weight of the container can be distributed and distribute that weight against spindles having a shape complementary to the domed container ends. The improved tilt roll table mounts the spindles on stiff, movable brackets which can be moved axially toward and away from the domed ends of the containers on the tilt roll table frame. A gear drive, which may be motor driven, advances the brackets linearly. In addition, bands encircle the containers hold them onto the frame during tilting and rolling motion.

These and other features and their advantages will be apparent to those skilled in the art of cleaning and handling UF$_6$ cylindrical containers from a careful reading of the Detailed Description of Embodiments of the Invention accompanied by the following drawings.

BRIEF DESCRIPTION OF THE DRAWINGS

In the figures.

DETAILED DESCRIPTION OF EMBODIMENTS OF THE INVENTION

Figure 2:
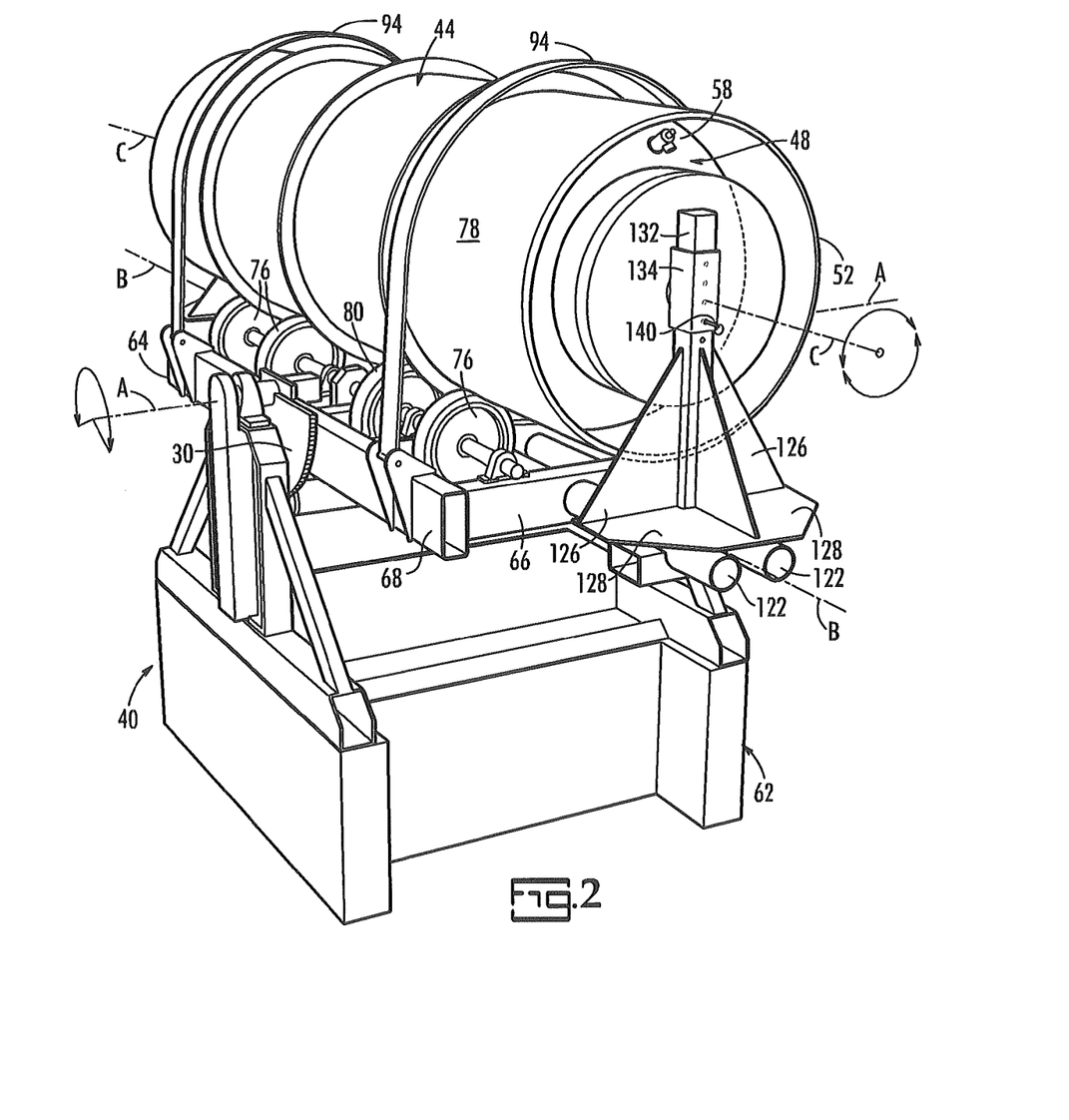
FIG. 2 illustrates in perspective a tilt roll table with a UF$_6$ cylinder mounted thereon, according to an embodiment of the present invention.
Figure 3:
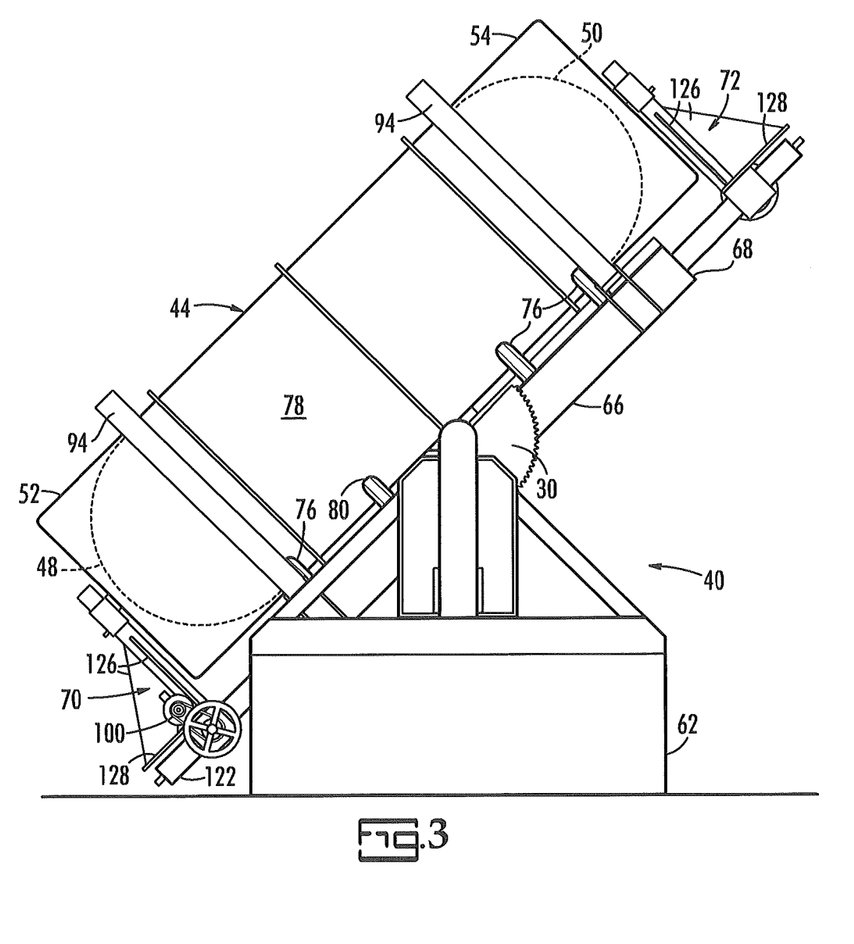
FIG. 3 is a side view of a tilt roll table as shown in FIG. 2 with a UF$_6$ cylindrical container shown in the tilted position, according to an embodiment of the invention.
Figure 4:
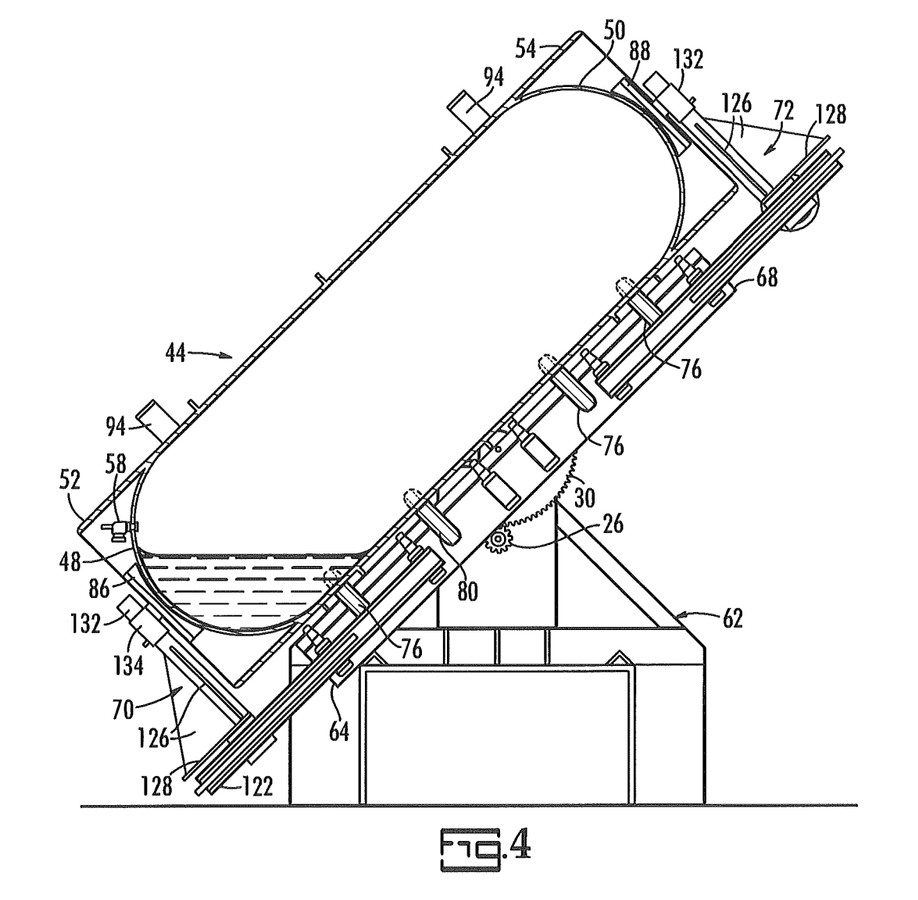
FIG. 4 is a side, cross sectional view of the tilt roll table and UF$_6$ cylindrical container as shown in FIG. 3, according to an embodiment of the invention.
Figure 5:
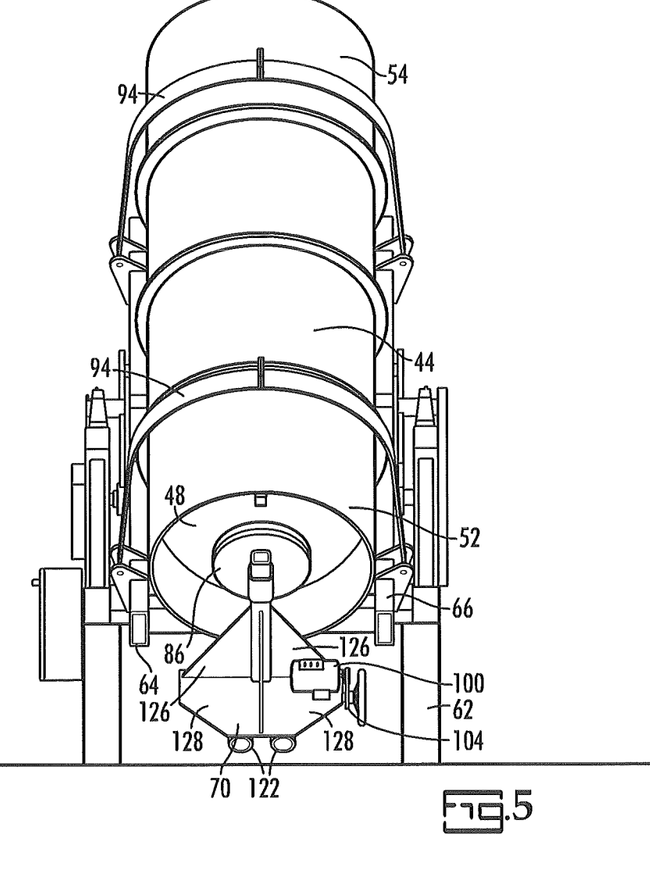
FIG. 5 is an end view of the tilt toll table and UF$_6$ cylindrical container of FIG. 3, according to an embodiment of the invention.

The present, improved tilt-roll table is illustrated in perspective in FIG. 2, in a side view in FIG. 3 from the opposing side, and in cross-section in a same side view in FIG. 4 as in FIG. 3. The present tilt roll table is generally indicated by reference number 40. Table 40 carries a cylindrical container 44 that is the work piece on which tilt-roll table 40 operates; cylindrical container 44 is not part of the present invention. Table 40 is an improvement in the prior art tilt-roll table 10 shown in FIG. 1 but has the same frame and the same pivoting and rolling mechanisms as does the prior art tilt roll table.

Cylindrical container 44 typically has opposing domed ends 48, 50, with skirts 52, 54, respectively. These containers are designed to meet certain industry standards for shipping uranium hexafluoride and will simply be referred to herein as containers or cylinders.

Skirts 52, 54, are steel extensions on container 44, extending from the cylindrical sides of cylindrical container 44 axially to protect domed ends 48, 50, respectively, from their sides and to allow cylindrical container 44 to stand on either skirt 52 or skirt 54.

Tilt roll table 40, as shown in FIGS. 2-4, may be used in mixing and swirling the contents of container 44. Those contents may be, for example, cleaning solutions or chemical solutions to dissolve the heel of UF$_6$ residue formed in the bottom of container 44.

Domed end 48 of container 44 is shown in FIG. 2; domed end 50, best seen in FIG. 3, is spaced apart from and opposes domed end 48. One of domed ends 48, 50, may carry a valve 58 that communicates with the interior of container 44 for venting the contents of container's interior. Skirts 52, 54, are sufficiently long enough to shield a valve 58 from damage. Valve 58 is located on one of domed ends 48, 50, and is positioned off center axis, that is, away from the axis of rotation of container 44.

Tilt-roll table 40 may include a base 62 that provides strong support for table 40 since it will support a frame 66 that tilts and rolls container 44 simultaneously, and which container 44 and its contents may weigh hundreds of pounds. Base 62 may be a floor, or a structure as shown that elevates tilt-roll table 40 above a floor and which base 62 is preferably made of a strong stable material, such as reinforced concrete or steel.

Container 44 is held securely to frame 66 of the improved tilt-roll table 40 which is secured to base 62 so as not to move during tilting and rolling of frame 66 and container 44. An axis A, shown in FIG. 2, is the axis about which frame 66 is tilted. Frame 66 has a first end 64 and an opposing second end 68 spaced apart from first end 64 by a sufficient distance so that container 44 will fit on frame 66 between first and second ends 64, 68. An axis B of frame 66 runs from first end 64 to second end 68, as shown in FIG. 2. Axis A is perpendicular to axis B and parallel to an axis C, also shown on FIG. 2, which is the rotational axis of container 44 when container 44 is placed on frame 66 and rotated.

Frame 66 is pivotally secured to base 62 so that frame 66 can be pivoted about horizontal pivot axis A between a first-end-higher position and a second-end-higher position, similar to the pivoting of a see-saw. Container 44 is tilted as frame 66 tilts through an angle defined by the range running from first end 64 of frame 66 being higher while the second end 68 of frame 66 is lower, to, after pivoting, second end 68 of frame 66 being higher while first end 64 of frame 66 is lower. A curved rack 30 and pinion gear operated by a motor are used for rotating frame 66, as in the prior art tilt roll table.

Tilt-roll table 40 also includes means for rotating the container about its axis of rotation when is it on frame 66. This rotating means may be rollers 76 mounted to frame 66 in a position to engage the exterior surface 78 of container 44 where they can, by their own rotation, urge container 44 to rotate. Rollers 76 may be made of a material selected to have good frictional engagement with exterior surface 78 of container 44 and wherein one (or more) such roller 76 is a driving roller 80. Driving roller 80 is itself driven by a second motor (not shown) via a belt or direct gear drive, as in the prior art tilt roll table.

A first bracket 70 is carried by first end 64 of frame 66; a second bracket 72 is carried by second end 64 of frame 66 so that first and second brackets 70, 72, oppose each other. At least one of first and second brackets 70, 72, such as first bracket 70, is movably attached to frame 66 so that it can be moved toward and away from second bracket 72 on frame 66, along axis B. Alternatively, both first and second brackets 70, 72, may be movable toward each other either independently or controlled so that they advance toward each other at the same rate or move apart at the same rate. First bracket 70 and second bracket 72 have rotatable platen or spindles 86, 88, respectively, that are shaped to conform to the shapes respective domed ends 48, 50, of container 44 so that spindles 86, 88, engage their respective domed ends 48, 50, with good surface contact, so that, when brackets 70, 72, engage container 44 between them and container 44 is being rotated about its cylindrical axis C by rollers 76 while being tilted reciprocally about axis A, first and second spindles 86, 88, will hold fast to and securely support domed ends 48, 50, of container 44.

First and second spindles 86, 88, are not large enough in diameter to interfere with off-axis valve 58 on first domed end 48 of container 44 but are otherwise large enough in surface area so that a portion of each domed end 48, 50, of container 44 engages and is supported by first and second spindles 86, 88, respectively, and thereby distributes the load of container 44 and its contents over the respective surfaces of spindles 86, 88. This load distribution is especially important when container 44 is oriented with one end higher than the other and a preponderance of the weight of container 44 and its liquid contents flows against the lower of first and second bracket 70, 72. Importantly, the weight of container 44 and its contents are not being borne by skirts 48, 50. Skirts 48 and 50 are relatively thin and subject to being deformed under load.

Acting as passive safety devices to hold container 44 to frame 66 are adjustable bands 94. Bands 94 prevent container 44 from rolling off tilt roll table 40.

Figure 9:
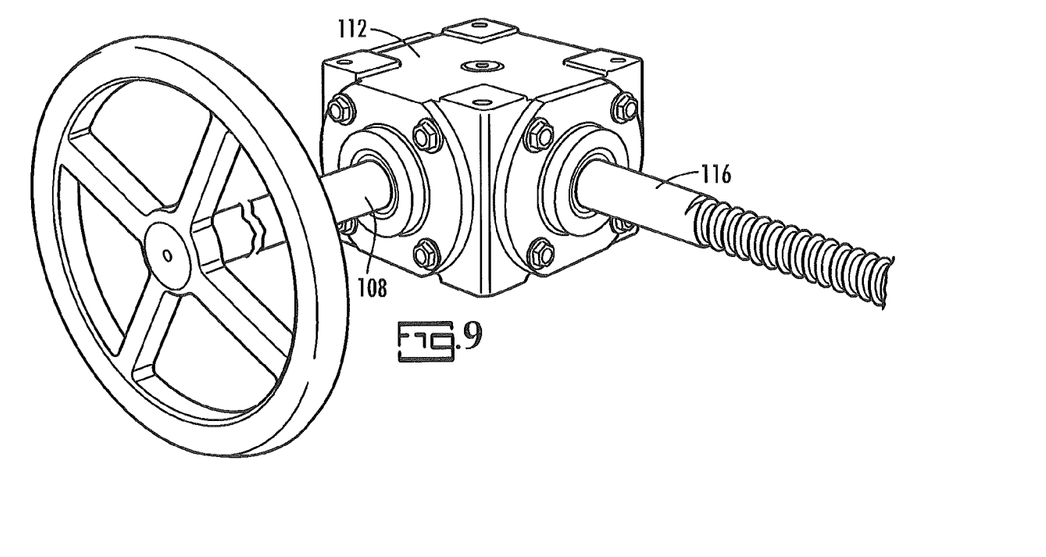
FIG. 9 is a perspective view of the gear connection and gear box of the tilt roll table of FIG. 2, according to an embodiment of the invention.

First and second brackets 70, 72 are moved using a motor 100 that rotates a belt or chain 104 around a drive shaft 108 that in turn enters a 90 degree gear box 112. The output of gear box 112 is a rotating threaded output shaft 116 to which first and second brackets 70, 72, are affixed. As output shaft 116 turns in a first direction, first and second brackets 70, 72, move toward each other, carried by output shaft 116. When output shaft 116 rotates in the opposing direction, first and second brackets 70, 72, move apart. Orientation and alignment of brackets 70, 72, is maintained as they slide on opposing rails 122.

Figure 6:
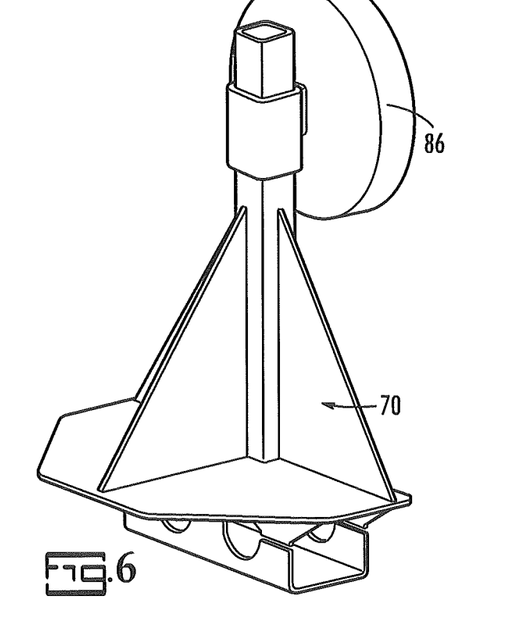
FIG. 6 is a perspective view of a detail of the tilt roll table of FIG. 2, according to an embodiment of the invention.
Figure 7:
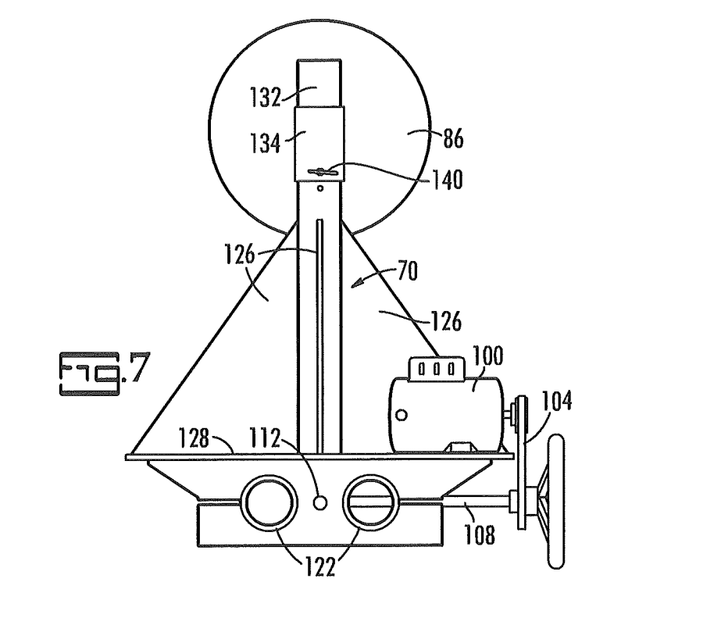
FIG. 7 is an end view of the detail of the tilt roll table of FIG. 2, according to an embodiment of the invention.
Figure 8:
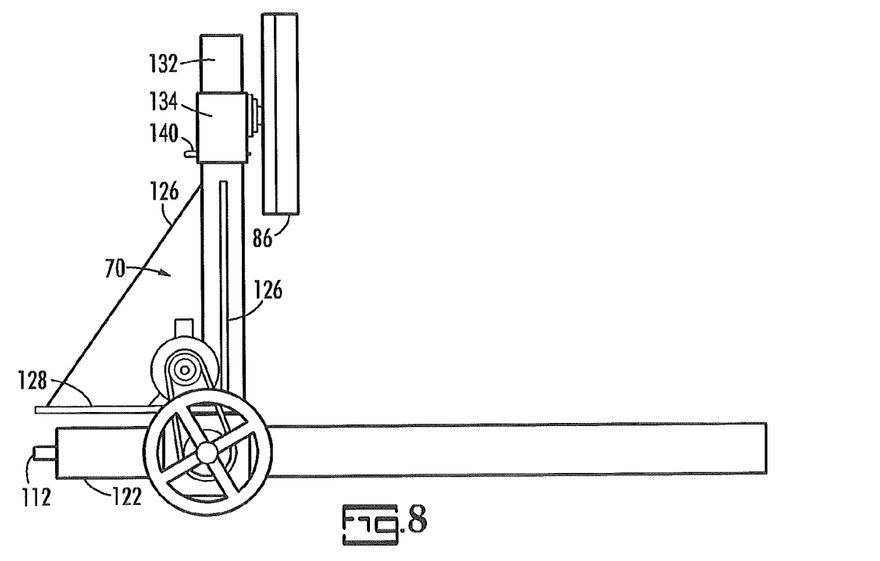
FIG. 8 is a side view of the detail of the tilt roll table of FIG. 2, according to an embodiment of the invention.

First and second end brackets 70, 72, are configured to support container 44 from the end when tilted when much of its weight bears against spindles 86, 88, respectively. For example, each bracket of end brackets 70, 72, includes three vertical braces 126 and two horizontal braces 128 on each end.

First and second spindles 86, 88, are mounted to a mast 132 using an adjustable sleeve 134 to accommodate containers 44 of different diameters. Sleeve 134 is secured in its appropriate vertical position on mast 132 by a pin 140 so that spindles 86, 88 engage the centers of first and second domed ends 48, 50 of container 44.

Table 40 is thus shown to be improved over prior art tilt roll table 10 of FIG. 1 in its ability to handle a heavy cylinder that may contain liquids when that table 40 is being simultaneously tilted and rolled, and its contents are being shifted. Spindles 86, 88, adjustably carried by end brackets 70, 72, grip the domed ends 48, 50, of cylinder 44 securely after being moved into position. Then, motor 100, operating through gear box 112, causes the rotation of drive shaft 116 by rotating drive shaft 108.

What is claimed is:

1. A tilt roll table for use in tilting and rolling a UF6 cylindrical container, said apparatus comprising:
    (a) a base;
    (b) a frame carried by said base and adapted to hold a cylindrical container, said frame having a first end and a spaced-apart, opposing second end, said frame being pivotally secured to said base so that said frame can be pivoted between a first-end-higher position and a second-end-higher position, said frame pivoting about a pivotal axis, said frame carrying plural rollers oriented to rotate about an axis perpendicular to said pivotal axis;
    (c) a pinion gear operatively connected to said frame for pivoting said frame about said pivotal axis;
    (d) a drive roller operatively connected to said frame for rotating at least one roller of said plural rollers when said cylindrical container is on said frame, said drive roller rotating said cylindrical container about an axis perpendicular to said pivotal axis;
    (e) a first bracket carried by said first end of said frame and an opposing second bracket carried by said second end of said frame, wherein said first bracket is movably attached to said frame so that said first bracket is movable toward and away from said second bracket, said first bracket carrying a first spindle and said second bracket carrying a second spindle;
    (f) a motor; and
    (g) an output shaft driven by said motor, with said first bracket being carried by said output shaft toward said second bracket;
    wherein, when said cylindrical container is on said frame with a first end of said cylindrical container oriented towards said first spindle and a second end of said cylindrical container oriented toward said second spindle, said first and second spindles engage said first and second ends, respectively, to support said cylinder when said cylinder is rotated by said drive roller and tilted by said pinion gear.

2. The tilt roll table as recited in claim 1, wherein said second bracket is movable toward and away from said first bracket.

3. The tilt roll table as recited in claim 1, wherein said spindle on said first bracket and said spindle on said second bracket are vertically adjustable.

4. The tilt roll table as recited in claim 1, further comprising adjustable bands carried by said frame, said bands encircling said cylindrical container when said cylindrical container is on said frame.

5. The tilt roll table as recited in claim 1, wherein said first bracket and said second bracket are braced for strength.

6. The tilt roll table as recited in claim 5, wherein said first bracket and said second bracket have vertical braces and horizontal braces.

7. The tilt roll table as recited in claim 6, wherein said first bracket and said second bracket have three vertical braces.

8. The tilt roll table as recited in claim 6, wherein said first bracket and said second bracket have two horizontal braces.

9. The tilt roll table as recited in claim 1, wherein said first and second ends of said cylindrical container are domed and wherein said spindles are concave to correspond to domed first and second ends of said UF6 cylindrical containers.

10. The tilt roll table as recited in claim 1, wherein said cylindrical container has a valve on at least one end of said first and second ends, said valve being off center, and wherein said spindles are dimensioned so as not to interfere with said valve.

11. The tilt roll table as recited in claim 1, further comprising:
    (a) an input shaft driven by said motor, and
    (b) a gear box connected to said input shaft and said output shaft.

12. A tilt roll table for use in tilting and rolling a UF6 cylindrical container, said apparatus comprising:
    (a) a base;
    (b) a frame carried by said base and adapted to hold a cylindrical container having a domed first end and a domed second end, said frame having a first end and a spaced-apart, opposing second end, said frame being pivotally secured to said base so that said frame pivot between a first-end-higher position and a second-end-higher position about a pivotal axis, said frame carrying plural rollers oriented to rotate about an axis perpendicular to said pivotal axis;
    (c) a pinion gear operatively connected to said frame for pivoting said frame about said pivotal axis;
    (d) a drive roller of said plural rollers so that, when said cylindrical container is on said frame, said drive roller rotates said cylindrical container about an axis perpendicular to sais pivotal axis;
    (e) a first bracket carried by said first end of said frame and an opposing second bracket carried by said second end of said frame, wherein said first bracket and said second bracket are movably attached to said frame so that said first bracket and said second bracket are movable toward each other, said first bracket carrying a first spindle and said second bracket carrying a second spindle, said first and second spindles being concave so as to fit against said first and second domed ends of a cylindrical container;
    (f) a motor; and
    (g) an output shaft driven by said motor, said first and second brackets being moved together and apart by said output shaft;
    wherein, when said cylindrical container is on said frame with a first end of said cylindrical container oriented towards said first spindle and a second end of said cylindrical container oriented toward said second spindle, said first and second spindles are in complementary engagement with said first and second ends, respectively, to support said cylinder when said cylinder is rotated by said drive roller and tilted by said pinion gear.

13. The tilt roll table as recited in claim 12, wherein said base is made of steel or reinforced concrete.

14. The tilt roll table as recited in claim 12, further comprising:
    (a) an input shaft driven by said motor, and
    (b) a gear box connected to said input shaft and said output shaft.

15. The tilt roll table as recited in claim 12, wherein said cylindrical container has a valve on at least one end of said first and second ends, said valve being off center, and wherein said spindles are dimensioned so as not to interfere with said valve.

16. The tilt roll table as recited in claim 12, wherein said first bracket and said second bracket are braced for strength.

17. The tilt roll table as recited in claim 16, wherein said first bracket and said second bracket have vertical braces and horizontal braces.

18. The tilt roll table as recited in claim 17, wherein said first bracket and said second bracket have three vertical braces and two horizontal braces.

19. A tilt-roll table for simultaneously tilting and rolling a UF6 cylindrical container for cleaning of internal surfaces, said apparatus comprising:
    (a) a base;
    (b) a frame carried by said base and adapted to hold a UF6 cylindrical container, said frame having a first end and a spaced-apart, opposing second end, said frame being pivotally secured to said base so that said frame can be pivoted between a first-end-higher position and a second-end-higher position, said frame pivoting about a pivotal axis (A) that is positioned perpendicularly to the longitudinal axis (C) of said cylindrical container, said frame carrying plural rollers oriented to rotate about an axis (B) perpendicular to said pivotal axis (A) while the frame is being pivoted;
    (c) a pinion gear operatively connected to same frame for pivoting said frame about said pivotal axis (A);
    (d) a drive roller operatively connected to said frame for rotating at least one roller of said plural rollers when said cylindrical container is on said frame, said drive roller rotating said cylindrical container about its longitudinal axis (C);
    (e) a first bracket carried by said first end of said frame and an opposing second bracket carried by said second end of said frame, wherein said first bracket is movably attached to said frame so that said first bracket is movable toward and away from said second bracket, said first bracket carrying a first spindle and said second bracket carrying a second spindle, with the first and second spindles are configured to be concave to receive domed ends of the cylindrical container, and wherein, when said cylindrical container is on said frame with a first domed end of said cylindrical container oriented towards said first spindle and a second domed end of said cylindrical container oriented toward said second spindle, said first and second spindles engage said first and second ends, respectively, to contact the domed ends of the cylindrical container in order to support said cylindrical container when said cylindrical container is being rotated by said drive roller and tilted by said pinion gear.

20. The tilt-roll table as recited in claim 19, wherein the spindles are rotatable with respect to their adjacent brackets to rotatably support the ends of said cylindrical container during pivoting and rotating.

21. A system for tilting and rolling a UF6 cylindrical container, said system comprising:
   a tilt-roll table as recited in claim 19, and
   a UF6 cylindrical container received by the tilt-roll table, the container having first and second ends that are domed,
   wherein said spindles of the tilt-roll table are concave to correspond to said domed first and second ends of said cylindrical container,
   wherein the UF6 cylindrical container has a valve on at least one end thereof, said valve being off center, and
   wherein said spindles are dimensioned so as not to interfere with said valve during rotation of the UF6 cylindrical container.

* * * * *